Figure 1:
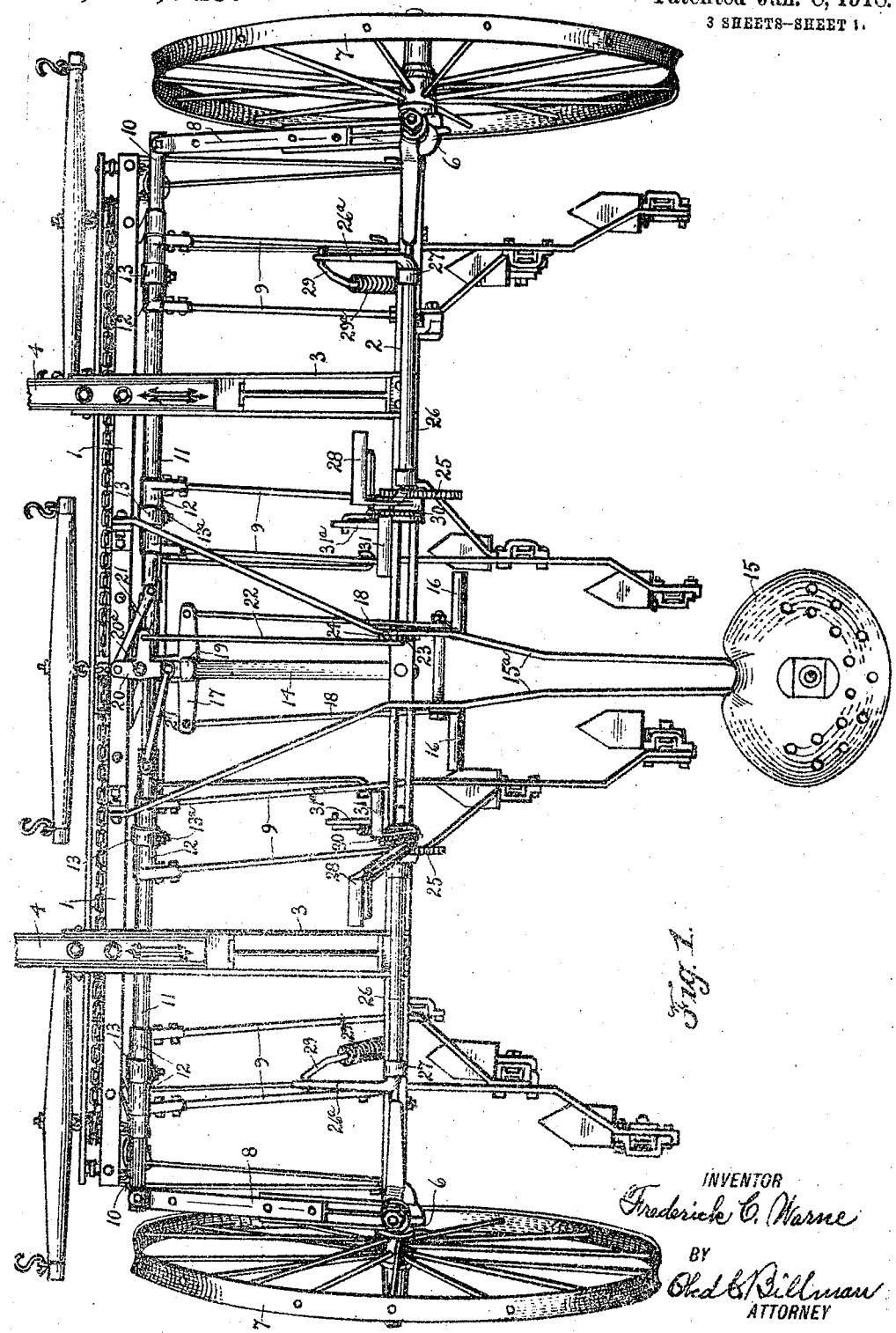

F. C. WARNE.
TWO ROW CULTIVATOR.
APPLICATION FILED MAY 27, 1915.

1,252,749.

Patented Jan. 8, 1918.
3 SHEETS—SHEET 3.

Inventor
Frederick C. Warne

By
Fred C. Billman
Attorney

UNITED STATES PATENT OFFICE.

FREDERICK C. WARNE, OF MANSFIELD, OHIO, ASSIGNOR TO RODERICK LEAN MANUFACTURING COMPANY, OF MANSFIELD, OHIO, A CORPORATION OF NEW JERSEY.

TWO-ROW CULTIVATOR.

1,252,749.  Specification of Letters Patent.  Patented Jan. 8, 1918.

Application filed May 27, 1915. Serial No. 30,806.

*To all whom it may concern:*

Be it known that I, FREDERICK C. WARNE, a citizen of the United States, residing at Mansfield, in the county of Richland and State of Ohio, have invented certain new and useful Improvements in Two-Row Cultivators, of which the following is a specification.

My invention relates to improvements in cultivators, and more particularly to that class or type of wheeled or riding cultivators known as "two-row cultivators" used in simultaneously cultivating two rows of corn or analogous crops through the medium of a plurality of suitably mounted cultivator gangs arranged in pairs to cultivate or pass along the sides of the respective rows to be cultivated.

The primary object of the invention is to provide a generally improved cultivator of this class which will not only be simple in construction and efficient in operation, but in which the various parts are so arranged and disposed relative to each other as to enable the operator or rider to readily move and control the same with a minimum expenditure of energy in meeting the varying demands of actual service.

More specifically stated, my invention has for one of its objects the provision of a pivot wheel cultivator of this class embodying improved means for shifting all of the cultivator beams or gangs laterally and simultaneously angling the pivot wheels in a similar or corresponding direction. In carrying out this object I provide a connecting shaft or bar extending between and connected to the pivot wheels whereby the latter are not only held in parallel relation to each other and are adapted to be simultaneously moved to the right or to the left but to provide a suitable bearing or support for the forward ends of the cultivator gangs or beams whereby the latter will be carried by such connecting shaft or bar in a similar direction with the movements imparted to the pivot wheels and at the same time maintaining the cultivator beams at all times in true parallel relation to each other as well as at right angles to the transverse members of the frame.

A still further object is the provision of improved gang operating and controlling mechanism whereby each pair of gangs for each row may not only be simultaneously raised or lowered independently of the other but whereby the beams or gangs of each pair may be individually adjusted to cultivate at various depths or each pair of gangs be moved laterally toward and from each other to vary the distance between each pair of gangs to adjust the same to rows of varying distances apart or irregularities therein while the cultivator is in operation.

A still further object is the provision of a combined pivot wheel and gang connecting and supporting member adapted not only to simultaneously pivot the wheels and move the gangs in the same general parallel relation to each other but to movably support the forward ends of the gangs or beams whereby the latter may be moved toward or from each other in general parallel relation independently of the actuation of said pivot wheels.

With the above mentioned and other ends in view, the invention consists in the novel construction, arrangement, and combination of parts, hereinafter described, illustrated in one of its embodiments in the accompanying drawings, and particularly pointed out in the appended claims.

Referring to the drawings forming a part of this specification, Figure 1, is a top plan view of a cultivator constructed in accordance with this invention.

Figure 2:
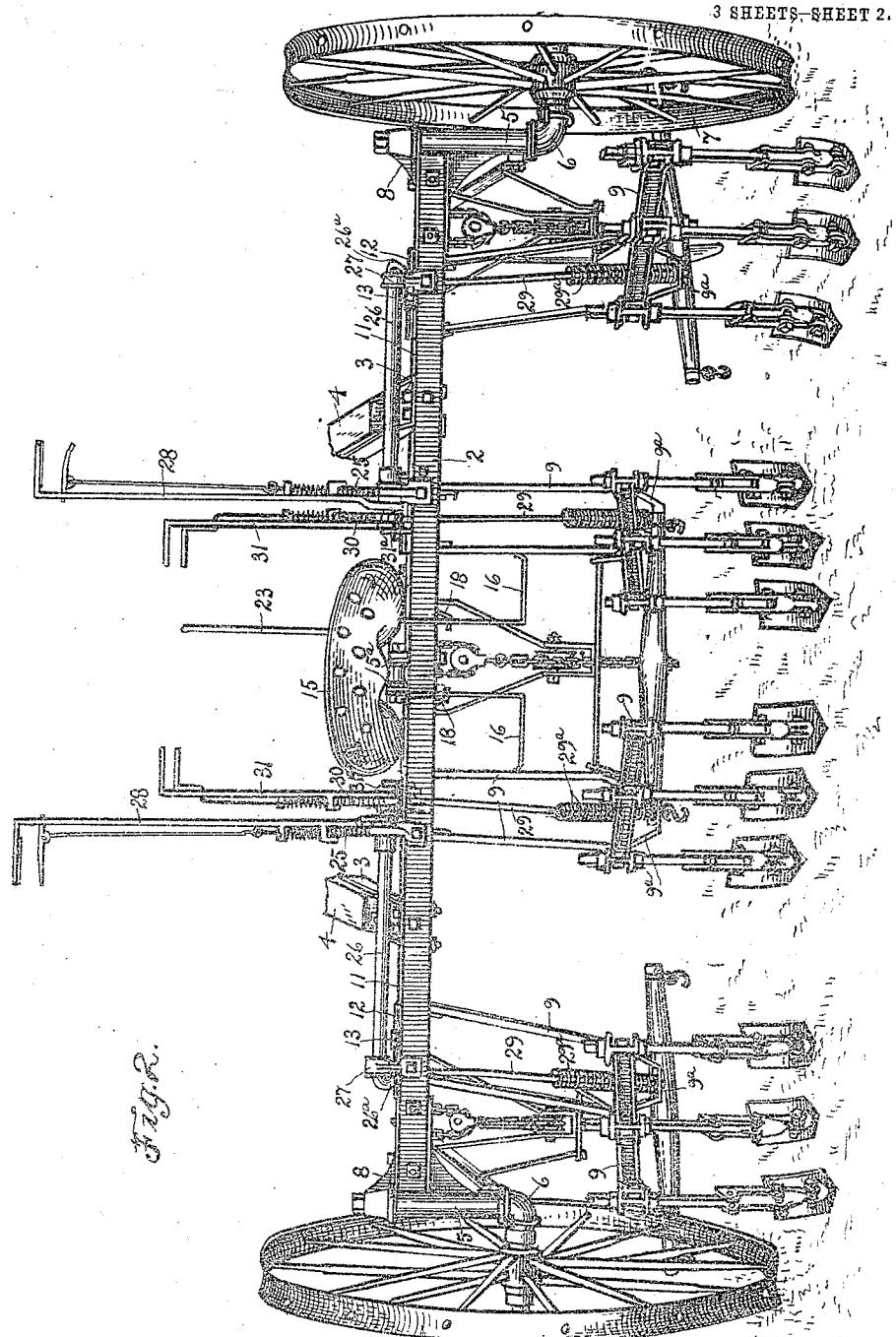

Fig. 2, a rear view of same.

Figure 3:
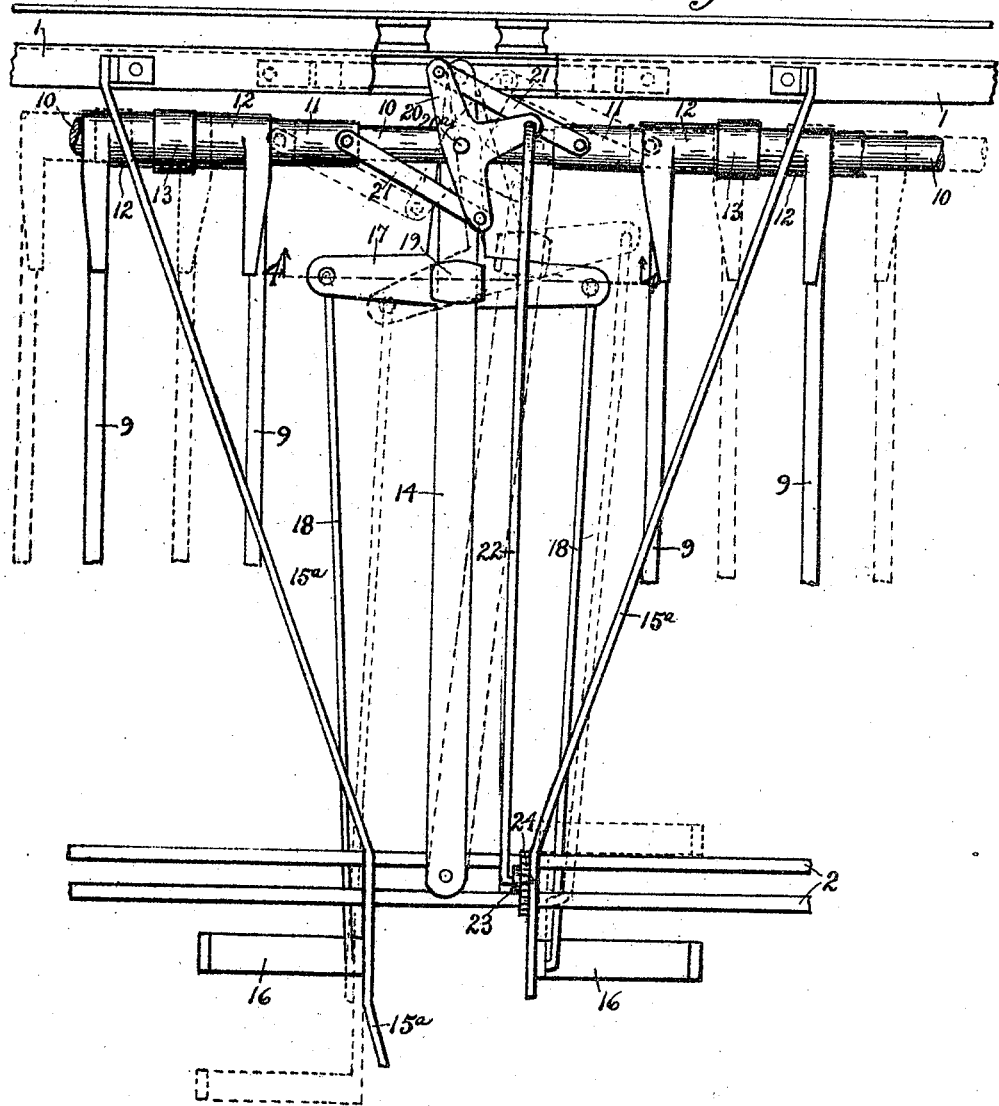

Fig. 3, an enlarged fragmentary top plan view of the central portion of the cultivator frame, the dotted lines illustrating the action and movements of the gang actuating or shifting device for simultaneously moving or shifting the pairs of gangs toward or from each other independently of the pivot wheel connecting and gang supporting member and likewise the arrangement and movement of the pivot wheel and gang actuating or shifting device for simultaneously and independently actuating the pivot wheels and gangs through the shifting or actuation of said pivot wheel connecting and gang supporting and shifting member.

Figure 4:
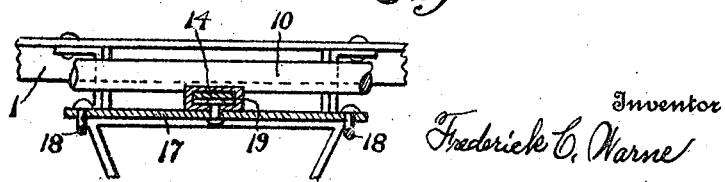

Fig. 4, a cross section view taken on line 4—4, of Fig. 3.

Similar numerals of reference designate like parts throughout all the figures of the drawings.

The improved cultivator comprises a suitable frame, consisting, in the present instance, of a front transverse frame member 1, and a rear transverse or axle frame member 2, said front and rear members 1 and 2, being connected by means of flanged or channeled stub pole members 3, adapted to receive and contain the pole or tongue members 4.

The rear or axle frame member 2, is provided at its ends with axle sleeves 5, adapted to receive and contain the vertically extending or bearing portions of the pivot axles 6, carrying the ground wheels 7, at their lower ends said pivot axles being provided at their upper ends with forwardly extending axle arms 8.

As a means of simultaneously pivoting or actuating the ground wheels 7, as well as maintaining the latter in true parallel relation to each other at all times, as well as providing a means of supporting and simultaneously moving the cultivator beams 9, laterally with the actuation of said ground wheels, the axle arms 8, are connected by means of a combined pivot wheel connecting and beam supporting and actuating member 10, said pivot wheel connecting and beam supporting or actuating member 10, in the present instance, being in the form of a tubular shaft, and as a means of movably connecting and supporting the forward ends of the cultivator or gang beams 9, in pairs whereby the pairs of gangs for each row may be simultaneously moved toward or from each other by the mechanism hereinafter described, the pivot wheel connecting, supporting and actuating member 10, is provided with a pair of gang sleeves 11, to which are secured the gang couplings 12, the latter being secured, in the present instance, as against lateral movements on the gang sleeves 11, by means of adjusting sleeves or collars 13, secured by means of set screws 13ª.

As a means of actuating or shifting the pivot wheel and beam supporting and actuating member 10, laterally and thereby simultaneously actuating the pivot or ground wheels 7, and all of the cultivator gang beams 9, to one side or the other, a pivot wheel and gang actuating or shifting device is provided, said device, in the present instance, comprising a shifting or actuating bar 14, pivotally attached at its forward-end to the pivot wheel and beam supporting and actuating member 10, and at its rear end to the rear or axle frame member 2, and as a means of shifting or actuating the bar 14, to one side or the other by the rider or operator while seated in the seat 15, carried by the seat beams 15ª, rigidly secured to the front and rear frame members 1 and 2, respectively, said seat beams 15ª, are provided with depending pivotally mounted foot or pedal levers 16, the latter being connected to a three-armed or three-point rotatably mounted member 17, by means of link members or connecting rods 18, the forwardly extending arm of the member 17, being pivotally secured to the front frame member 1, and the pivoted or central bearing portion of the member 17, being slidably connected to the shifting or actuating bar 14, by means of a bearing sleeve 19, which sleeve 19, is adapted to slide upon the actuating bar 14, as the latter is given its requisite movements to the right or to the left in actuating the supporting or shifting member 10, as indicated by dotted lines in Fig. 6 of the drawings. By reason of the mechanism and connections above described it is apparent that when the right hand foot lever 16, is moved forwardly it carries the rear or pivoted portion of the three-armed member 17, to the right thereby carrying with it the forward end of the shifting or actuating bar 14, and the latter being pivotally connected to the shaft or member 10, said shaft or member 10, in turn pivots the pivot or ground wheels 7, and carries all of the gangs to the right as indicated by dotted lines in Fig. 3 of the drawings, and when the left hand foot lever 16, is moved forwardly and the right hand foot lever is moved rearwardly the parts will be moved in a reverse direction and impart a reverse movement in an obvious manner.

As a means of moving the pairs of gangs on the gang sleeves 11, toward or from each other independently of the pivot wheel and gang actuating or shifting mechanism described, a three-armed member or crank 20, is pivotally mounted upon the pivot wheel and beam supporting and actuating member 10, by means of a pivot bolt 20ª, or other suitable securing and bearing member, two of the oppositely arranged arms of the member 20, being adapted to normally extend forwardly and rearwardly and being connected to the inner ends of the gang sleeves 11, through the medium of link or connecting members 21, and as a means of actuating or shifting the armed or crank member 20, a third arm or crank extending to one side is connected to a connecting rod or link 22, the latter extending rearwardly to an upwardly extending lever 23, mounted, in the present instance, on one of the seat beams 15ª and adapted to be adjusted through the medium of a suitable ratchet segment 24, and suitable coöperating pawl or latching mechanism. It is therefore apparent that by moving the lever 23, forwardly and rearwardly the gang sleeves and the respective pairs of gangs carried thereby will be moved toward and from each other to meet the varying demands of actual service while the cultivator is in operation.

As a means of simultaneously elevating or depressing each pair of cultivator gangs independently of the other, or of individually adjusting the gangs of each pair, stationary master ratchet segments 25, are mounted on the rear or axle frame member 2, said ratchet segments 25, forming bearings for the inner ends of rock shafts 26. The rock shafts 26, are supported at their outer ends by means of bearing brackets 27, and the inner ends of said rock shafts are provided with master levers 28, adapted to be adjusted on the ratchet segments 25, in a well known and understood manner. The outer ends of the rock shafts 26, terminate in crank arms 26ª, connected to depending gang connecting rods 29, the lower ends of said rods passing through suitable openings in gang clips or brackets 9ª, and the lower ends of said rods 29, are provided with pressure or tension springs 29ª, operating in a well known and understood manner.

As a means of moving or adjusting the inner or adjacent gang members of each pair of gangs independently of the outer gangs of each pair, independent ratchet segments 30, are securely attached to the inner ends of the rock shafts 26, and are adapted to be rocked in unison with the actuation of the rock shafts 26, when the latter are moved by the master-levers 28, and when the master levers 28, and rock shafts 26, are held in a stationary position, the inner gangs of each pair may be moved through the medium of independent inner levers 31, pivotally mounted on the inner ends of the rock shafts 26, in coöperative relation to the ratchet segments 30, secured to and carried by the inner ends of the rock shafts 26, said inner levers 31, being provided with crank arms 31ª, connected to the inner or adjacent gangs of each pair by means of gang connecting rods 29, the latter being connected to the gangs in a manner similar to the gang connecting rods 29, connected to the outer ends of the rock shafts 26, hereinbefore described.

The improved three-horse hitch or equalizer herein shown is made the subject-matter of an application filed November 2, 1915, Serial No. 64,228.

From the foregoing description, taken in connection with the accompanying drawings, the operation and advantages of my invention will be readily understood.

Having thus described one of the embodiments of my invention, what I claim and desire to secure by Letters Patent, is,—

1. In a cultivator, a frame provided with pivot wheels, a shaft for connecting and actuating said wheels in parallel relation to each other, means including a shifting bar and foot operated mechanism on said frame for actuating said shaft, vertically movable cultivator beams slidably mounted on said shaft in parallel relation to each other, and means for moving said cultivator beams laterally toward and from each other either simultaneously in pairs or individually independently of said shaft actuating means.

2. In a cultivator, a frame provided with pivot wheels, a pivot wheel connecting and actuating member, gang sleeves slidably mounted thereon, cultivator gangs connected to said sleeves, means including a shifting bar and foot operated lever mechanism on said frame for actuating said pivot wheel connecting and actuating member, and means for actuating said gang sleeves independently of the actuation of said pivot wheel connecting and actuating member.

3. In a cultivator, the combination with a frame provided with a pair of pivot wheels, a transversely extending laterally movable shaft operatively connected to said pivot wheels, and shifting bar and lever means for actuating and adjusting said shaft; of gang sleeves slidably mounted on said shaft, a pair of cultivator gangs mounted on each of said gang sleeves, and means for moving and adjusting said gang sleeves toward and from each other.

4. In a pivot wheel cultivator, the combination with a combined pivot wheel and beam supporting and actuating shaft, and means for moving and adjusting said shaft; of a pair of gang sleeves mounted on said shaft, cultivator gangs sleeved on said gang sleeves, means for laterally adjusting said cultivator gangs on said gang sleeves, and means on said shaft for moving said gang sleeves toward and from each other independently of the movements of said shaft.

5. In a pivot wheel cultivator, the combination with a laterally movable pivot wheel connecting and actuating shaft, and means for moving and adjusting the latter; of cultivator gangs sleeved in pairs on said shaft, means on said shaft for moving and adjusting said pairs of cultivator gangs toward and from each other, and means for raising and lowering each pair of cultivator gangs independently of the other or for raising and lowering each gang individually.

6. In a cultivator, the combination with a pair of pivot wheels, and a pivot wheel connecting and actuating shaft; of means for shifting and adjusting said shaft, vertically and laterally movable cultivator gangs adjustably mounted on said shaft in parallel relation to each other, means for adjusting said gangs individually and laterally to regulate the distance between the gangs of the respective pairs, and link and bell crank lever members on said shaft for moving and adjusting said cultivators gangs laterally on said shaft.

7. In a cultivator, including a frame provided with pivot wheels, and a laterally movable pivot wheel connecting and actuating shaft, means on said frame for actuating said shaft, cultivator gangs sleeved in pairs on said shaft, means for adjusting said cultivator gangs individually toward and from each other to regulate the distance between the gangs of the respective pairs, and means for moving said pairs of cultivator gangs on said shaft independently of said shaft actuating means.

8. In a cultivator, the combination with a frame provided with pivot wheels, a pivot wheel connecting and actuating shaft, and means on said frame for moving and adjusting said shaft; of pairs of cultivator gangs vertically and laterally movable on said shaft, means for moving said gangs laterally on said shaft independently of the actuation of the latter, and means on said frame for vertically moving said pairs of cultivator gangs independently of each pair or individually with respect to each other.

9. In a cultivator, the combination with a pair of pivot wheels, a laterally movable pivot wheel and beam supporting and actuating shaft, and means for moving and adjusting said shaft; of pairs of cultivator gangs vertically and laterally movable on said shaft in parallel relation to each other, means for laterally moving and adjusting said pairs of cultivator gangs, and means for vertically moving and adjusting said cultivator gangs either in pairs or singly independently of said laterally moving and adjusting means.

10. In a cultivator, the combination with a frame provided with pivot wheels, a laterally movable pivot wheel connecting and actuating member, and means for moving and controlling said connecting and actuating member; of cultivator gangs sleeved in pairs on said pivot wheel connecting and actuating member, means for adjusting said cultivator gangs individually and laterally toward and from each other, and means for simultaneously moving said pairs of cultivator gangs toward and from each other on said pivot wheel connecting and actuating member.

11. In a cultivator, the combination with a frame provided with pivot wheels, a laterally movable pivot wheel connecting and actuating shaft, and means for actuating and adjusting said shaft; of cultivator gangs arranged in pairs and vertically and laterally movable on said shaft, means for laterally and individually adjusting said gangs of each pair, means for laterally moving said pairs of cultivator gangs on said shaft toward and from each other, and means for vertically moving and adjusting said pairs of cultivator gangs independently of each pair or singly with respect to each other.

12. In a pivot wheel cultivator, a combined pivot wheel and beam supporting and actuating member carrying vertically and laterally movable cultivator gangs arranged in pairs and held in parallel relation to each other, means for laterally and individually adjusting said gangs of each pair, means for simultaneously and uniformly moving said pairs of cultivator gangs toward and from each other, means for laterally moving and adjusting said pivot wheel and beam supporting and actuating member, and means for vertically moving and adjusting said pairs of cultivator gangs independently of each pair or singly with respect to each other.

13. In a cultivator, the combination with a frame provided with pivot wheels and a laterally movable pivot wheel connecting and actuating shaft beneath the front portion of said frame, and means on said frame for moving and adjusting said laterally movable shaft; of gang sleeves slidably mounted on said shaft, a pair of gangs arranged in fixed parallel relation upon each of said gang sleeves, and means for moving and adjusting said gang sleeves and pairs of gangs toward and from each other independently of the actuation of said pivot wheel connecting and actuating shaft.

14. A cultivator, comprising a frame including a front transverse frame member and a rear transverse or axle member, pivot wheels carried by the latter and provided with forwardly extending axle arms, a laterally movable shaft carried by said arms in proximity to said front transverse frame member, vertically and laterally movable cultivator gangs arranged in pairs and sleeved on said shaft, means on said shaft for laterally moving said pairs of cultivator gangs toward and from each other, a shifting or actuating bar pivotally connected at its rear to said axle frame member and at its front to said shaft, and foot operated mechanism connected to said shifting or actuating bar whereby the latter may be shifted to the right or to the left to correspondingly move said shaft and the pivot wheels and cultivator gangs carried thereby.

In testimony whereof I have affixed my signature in presence of two witnesses.

FREDERICK C. WARNE.

Witnesses:
  D. A. MEIES,
  C. A. HINES.